US010955283B2

(12) United States Patent
Hogea et al.

(10) Patent No.: US 10,955,283 B2
(45) Date of Patent: Mar. 23, 2021

(54) WEIGHT-BASED KITCHEN ASSISTANT (71) Applicant: PEPPER LIFE INC., Chicago, IL (US)

(72) Inventors: Andrei Hogea, Chicago, IL (US); Mihai Hogea, Chicago, IL (US); Zachary Pino, Chicago, IL (US)

(73) Assignee: Pepper Life Inc., Chicago, IL (US)

(*) Notice: Subject to any disclaimer, the term of this patent is extended or adjusted under 35 U.S.C. 154(b) by 107 days.

(21) Appl. No.: 16/215,879

(22) Filed: Dec. 11, 2018

(65) Prior Publication Data

US 2019/0186986 A1 Jun. 20, 2019

Related U.S. Application Data (60) Provisional application No. 62/607,177, filed on Dec. 18, 2017.

(51) Int. Cl.
*G09B 19/00* (2006.01)
*G01G 19/30* (2006.01)
*G01G 19/56* (2006.01)
*G06F 3/16* (2006.01)
*G01G 23/36* (2006.01)
*G10L 15/26* (2006.01)
*G01G 19/414* (2006.01)

(52) U.S. Cl.
CPC ......... *G01G 19/4146* (2013.01); *G01G 19/30* (2013.01); *G01G 19/56* (2013.01); *G01G 23/36* (2013.01); *G06F 3/167* (2013.01); *G09B 19/0092* (2013.01); *G10L 15/26* (2013.01)

(58) Field of Classification Search
CPC ..... G09B 19/0092; B25J 13/08; B25J 11/008; A47G 21/00; A47G 23/10; A47G 21/08; A47G 2200/046
USPC ...................................... 177/25.16
See application file for complete search history.

(56) References Cited

U.S. PATENT DOCUMENTS 6,978,221 B1 12/2005 Rudy
7,096,221 B2 8/2006 Nakano
(Continued)

FOREIGN PATENT DOCUMENTS

JP 2014163856 * 9/2014

OTHER PUBLICATIONS

2017 International Conference on Sensing, Diagnostics, Prognostics, and Control, Design of multifunctional electronic scale based on single chip microcomputer, Runan et al. (Year: 2017).*

(Continued)

*Primary Examiner* — Jacques M Saint Surin
(74) *Attorney, Agent, or Firm* — Faegre Drinker Biddle & Reath LLP (57) ABSTRACT

A weight-based kitchen assistant in the form of a voice-assisted electronic scale allows a user to quickly convert weight measurements to volumetric measurements, determine accurate nutritional information of a food item based on its weight, and follow the steps of a recipe hands-free while cooking or baking in the kitchen. When connected to peripheral storage vessels, the weight-based kitchen assistant allows the user to manage and locate where ingredients are stored. The weight-based kitchen assistant also provides the user with the ability to measure accurate serving sizes and perform personalized dietary tracking.

20 Claims, 11 Drawing Sheets

(56) References Cited

U.S. PATENT DOCUMENTS

| | | |
|---|---|---|
| 7,999,674 B2 | 8/2011 | Kamen |
| 8,829,365 B1 | 9/2014 | Wallace et al. |
| 9,645,007 B2 | 5/2017 | Wallace et al. |
| 9,772,217 B2 | 9/2017 | Wallace et al. |
| 2002/0124017 A1 | 9/2002 | Mault |
| 2006/0036395 A1 | 2/2006 | Shaya et al. |
| 2012/0055718 A1* | 3/2012 | Chen .................. G06F 19/3475 177/3 |
| 2013/0203024 A1* | 8/2013 | Dekar .................... A47G 21/08 434/127 |
| 2014/0289323 A1* | 9/2014 | Kutaragi ................ H04L 67/42 709/203 |
| 2015/0362359 A1 | 12/2015 | Wallace |
| 2016/0270574 A1* | 9/2016 | Dekar ................ G09B 19/0092 |
| 2019/0318759 A1* | 10/2019 | Doshi ..................... G10L 15/05 |
| 2020/0051559 A1* | 2/2020 | Park ....................... G06F 3/167 |

OTHER PUBLICATIONS

U.S. Patent and Trademark Office; Decision Denying Institution of Inter Partes Review; Case IPR2018-01596; U.S. Pat. No. 3,772,217 B2; Mar. 2, 2019.

\* cited by examiner

WEIGHT-BASED KITCHEN ASSISTANT

RELATED APPLICATIONS

This application claims priority to Provisional Application No. 62/607,177, filed on Dec. 18, 2017, entitled "WEIGHT BASED KITCHEN ASSISTANT," and is incorporated herein by reference.

FIELD OF THE DISCLOSURE

The disclosure relates generally to digital kitchen assistants for food preparation, and more particularly, to a voice-assisted electronic scale for weighing food items used in a recipe and for calculating their nutritional values.

BACKGROUND

Many users enjoy making and exploring new recipes. They use scales and measuring cups to measure exact weights and volumetric quantities, while following along a recipe on their personal devices (e.g., smartphones or tablets). While these devices give the users access to many new recipes, the users must constantly access the touchscreen on these devices in order to follow the recipe. This interaction forces the users to constantly wash or clean their hands which makes the cooking process cumbersome and inconvenient.

Digital kitchen assistants with voice recognition services (e.g., Amazon Alexa, Apple Siri, Microsoft Cortana, Google Assistant, etc.) allow the users to follow recipes in a more natural manner-through conversational interfaces. This provides a more unique experience in the kitchen.

SUMMARY

According to one embodiment of the present disclosure, an electronic scale and a method thereof are provided. The electronic scale includes a weight sensing module for weighing a food item and a controller configured to perform various functions of the electronic scale. The electronic scale receives a voice command associated with the food item from a user. The electronic scale transmits the received voice command to a voice processing server for natural language interpretation. In turn, the electronic scale receives a response from the voice processing server indicating an interpreted voice command. Based on the interpreted voice command, the electronic scale accesses and analyzes a database to determine food data attributed to the food item. The electronic scale then receives a portion of the food item on the weight sensing module and measures a quantity of the food item based on the portion of the food item received and the food data attributed to the food item.

When the quantity of the food item has been measured, the electronic scale indicates this to the user by way of a visual feedback signal and/or an audio feedback signal.

The received voice command may include or specify the quantity of the food item to be measured. As such, if the quantity of the food item has not been measured based on the portion of the food item received, the electronic scale continues to receive additional portions of the food item. Also, the received voice command may be based on a signal transmitted from the user's device such as a mobile device.

The received voice command may include or specify a measurement of a volumetric quantity of the food item. In this case, the electronic scale determines a density value in the food data to convert the volumetric quantity into a weight quantity. The electronic scale determines that the volumetric quantity of the food item has been measured based on the portion of the food item received and the density value.

The received voice command may include or specify a measurement of a nutritional value of the food item. In this case, the electronic scale determines a nutritional value conversion factor in the food data. The electronic scale determines the nutritional value of the food item based on the portion of the food item received and the nutritional value conversion factor.

The received voice command may include or specify a determination of where the food item is located within a kitchen. In this case, the electronic scale analyzes the database to determine a storage vessel that contains the food item within the kitchen. Upon determining the storage vessel, the electronic scale transmits a signal to the storage vessel to enable the storage vessel to be identified by the user.

The received voice command may include or specify an indication to follow a recipe that includes the food item. In this case, the electronic scale analyzes the database to determine one or more steps of the recipe. The electronic scale provides instructions to the user to follow the one or more steps of the recipe by measuring the quantity of the food item.

According to another embodiment of the present disclosure, a system is provided that includes an electronic scale and a database. The electronic scale includes a controller configured to: receive a voice command associated with a food item from a user; transmit the received voice command to a voice processing server for natural language interpretation; and receive a response from the voice processing server indicating an interpreted voice command. Based on the interpreted voice command, the electronic scale analyzes the database to determine food data attributed to the food item. A portion of the food item is received on the electronic scale and the electronic scale measures a quantity of the food item based on the portion of the food item received and the food data attributed to the food item.

Among other advantages, the electronic scale allows a user to convert volumetric measurements to weight measurements and vice versa, determine the nutritional value of a food item based on its weight, quickly scale a recipe based on the number of servings needed, and limit intakes of specific nutritional values for a meal (e.g., calorie counting or limiting diabetic sugar intake). The electronic scale also allows the user to create his/her own recipes and conveniently locate food items stored in connected storage vessels within the kitchen.

BRIEF DESCRIPTION OF THE DRAWINGS

The embodiments will be more readily understood in view of the following description when accompanied by the below figures and wherein like reference numerals represent like elements.

DETAILED DESCRIPTION

While this invention is susceptible of embodiments in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

All recipes are based off ratios and/or quantities of ingredients. Many recipes require a user to measure out specific quantities of ingredients to create a desired mixture or taste. As such, it is useful to convert weight measurements to volumetric measurements (and vice versa), and quickly scale up servings based on the number of individuals eating a meal.

Figure 1:
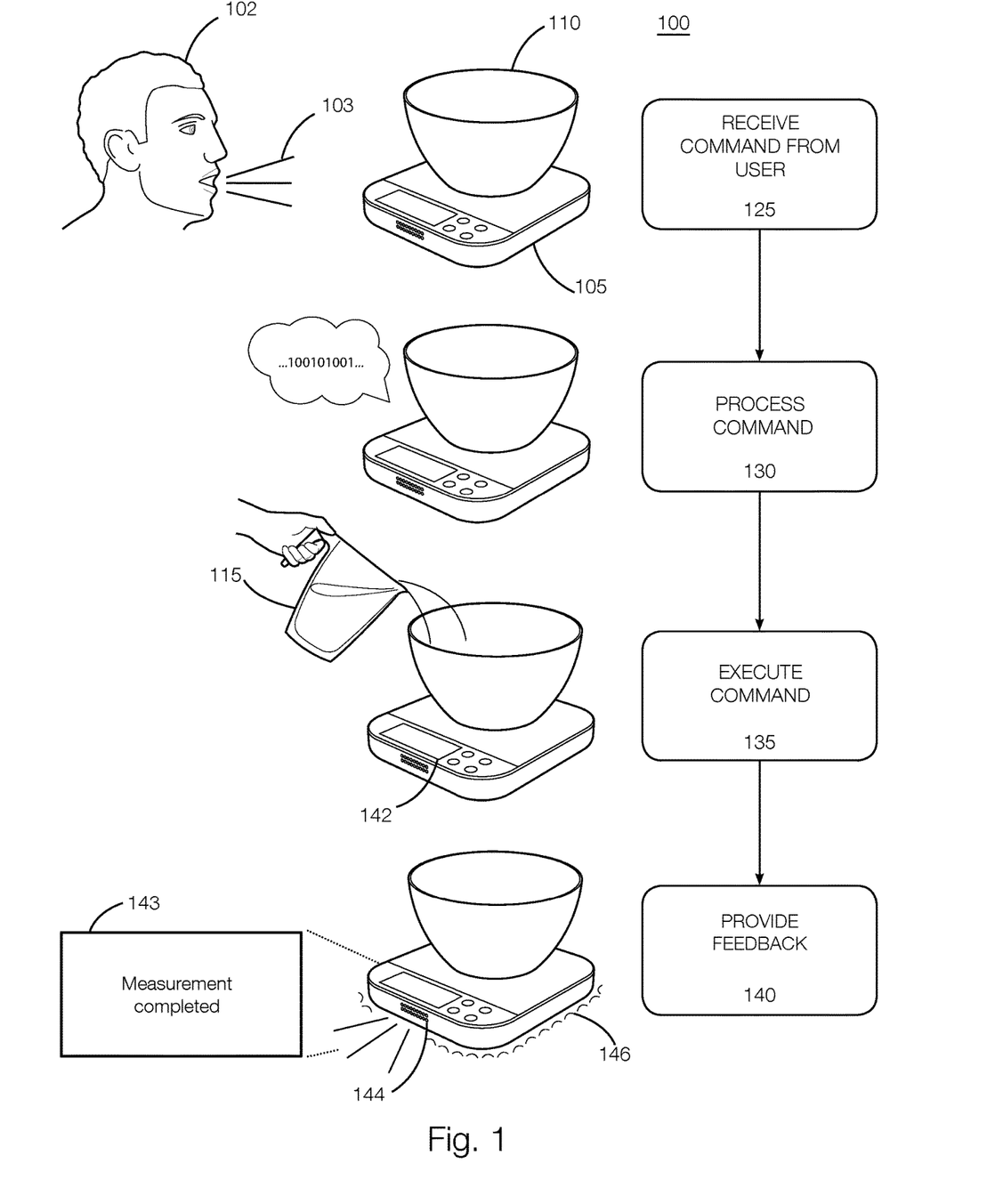
FIG. 1 is a flow diagram of a process for using a weight-based kitchen assistant.

FIG. 1 is a flow diagram of a process for using a weight-based kitchen assistant 105 to perform various measurement tasks with commands from a user 102. As shown in FIG. 1, weight-based kitchen assistant 105 is in the form of a voice-assisted electronic scale. An example measurement task 100 begins with weigh-based kitchen assistant 105 receiving a command from user 102 (block 125). For example, user 102 may speak or utter a voice command 103, such as "measure two cups of flour." In some embodiments, the received command may include signals generated by a software application (i.e., an "app") running on user 102's device (e.g., mobile device, computer, network, etc.).

Voice command 103 is processed by weight-based kitchen assistant 105 (block 130). Processing voice command 103 includes transmitting voice command 103, via a network (e.g., the Internet), to an external voice processing center or server (e.g., Amazon Alexa voice server) for natural language interpretation and receiving an interpreted voice command back from the voice processing server. The interpreted voice command may be in a format (e.g., text, binary, audio, etc.) that is recognizable by weight-based kitchen assistant 105.

Generally, weight-based kitchen assistant 105 is calibrated to the weight of a bowl 110 used in a recipe. This calibration is commonly referred to as "tearing" or "zeroing," which allows weight-based kitchen assistant 105 to accurately measure the weight of an ingredient or food item 115. However, in some embodiments, the use of bowl 110 is not needed.

Upon receiving the interpreted voice command, weight-based kitchen assistant 105 executes the interpreted voice command and prompts user 102 to begin the measurement process (block 135). User 102 proceeds to add food item 115 into bowl 110. Weight-based kitchen assistant 105 then calculates the weight of food item 115 in real-time. A display 142 on weight-based kitchen assistant 105 provides user 102 with the measurement progress.

Once a quantity of food item 115 matches a goal of the measurement task, weight-based kitchen assistant 105 provides user 102 with an appropriate visual and/or audio feedback (block 140). For example, display 142 may display a message 143 indicating that the measurement task has been successfully completed. As another example, speakers 144 on weight-based kitchen assistant 105 may announce or broadcast message 143 to user 102. As a further example, LED lights 146 on weight-based kitchen assistant 105 may light up or flash as a result. These feedback signals may serve to tell user 102 to stop adding food item 115 into bowl 110.

Figure 2:
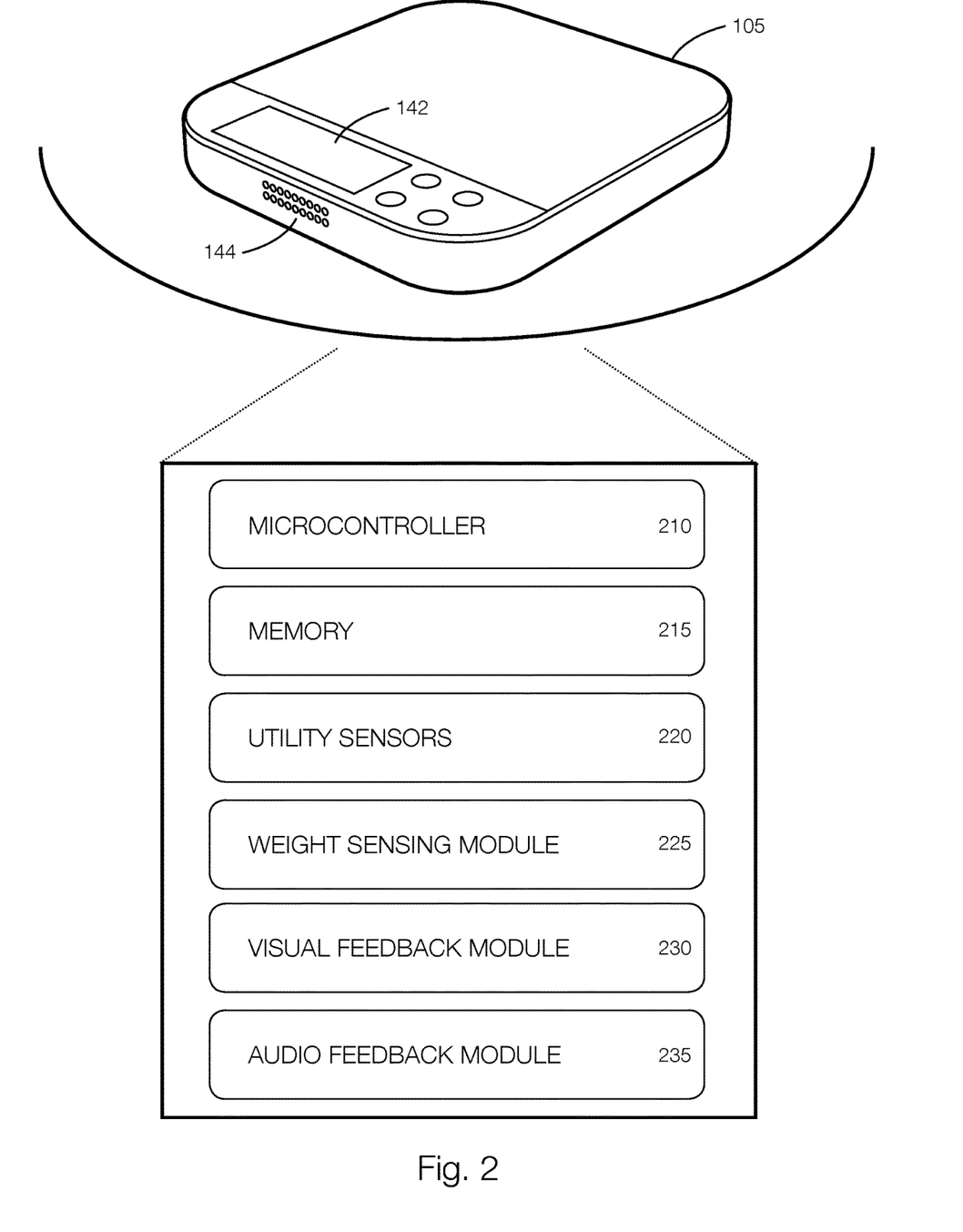
FIG. 2 is a block diagram of a hardware architecture for a weight-based kitchen assistant.

FIG. 2 is a block diagram for an example hardware architecture for weight-based kitchen assistant 105. As shown in FIG. 2, weight-based kitchen assistant 105 includes a number of components, but is not limited to, a microcontroller 210, memory 215, utility sensors 220, a weight sensing module 225, a visual feedback module 230, and an audio feedback module 235.

Microcontroller 210 is responsible for executing instructions on weight-based kitchen assistant 105 to perform measurement tasks. In some embodiments, weight-based kitchen assistant 105 may include one than one microcontroller and/or other suitable controllers or processing devices (e.g., microprocessors, DSPs, ASICs, FPGAs, etc.). Microcontroller 210 is configured to send signals to and receive signals from other components or modules of weight-based kitchen assistant 105. Microcontroller 210 is also configured to transmit and receive signals, via a communication network, to and from external servers and databases.

Memory 215 is configured to store data and instructions used by weight-based kitchen assistant 105. As used herein, memory 215 may include random access memory (RAM), read-only memory (ROM), erasable programmable read-only memory (e.g., EPROM, EEPROM, or Flash memory), or any other tangible medium capable of storing information.

Utility sensors 220 include various sensors such as temperature sensors for heat calibration, pressure sensors for activity monitoring, RFID sensors for additional device communication, etc.

Weight sensing module 225 includes components or devices configured to measure a weight of an object placed on weight-based kitchen assistant 105. In an example embodiment, these components include one or more micro load cells along with an analog-to-digital converter (e.g., HX711 chip). During operation, the micro load cells are configured to measure analog electrical resistances (e.g., via a Wheatstone bridge) produced by placing the object on the micro load cells. The measured electrical resistances are then processed by the analog-to-digital converter, which converts the analog signals into digital signals readable by microcontroller 210.

Visual feedback module 230 is configured to communicate visual information with a user. As such, visual feedback module 230 controls the function of components or devices such as display 142 (e.g., a TFT display, an alphanumeric display, a 7-segmented display, a dot matrix display, LCD, OLED, etc.) and LED lights 146. The user may be notified via visual feedback module 230. For example, through display 142, visual feedback module 230 can communicate a next step in a recipe (e.g., displaying the text "add two cups of flour") to the user. As another example, through a ring of LED lights 146 that surround an object placed on weight-based kitchen assistant 105, visual feedback module 230 can communicate progress information to the user by lighting up LED lights 146 to indicate the fulfillment of a required goal.

Audio feedback module 235 is configured to communicate audio information with a user. As such, audio module 235 controls the function of components or devices such as a microphone (not shown) and speakers 144, which act as a conversational interface. During operation, the microphone receives an audio or voice command from the user which is sent to microcontroller 210. Microcontroller 210 transmits the voice command, via a network, to an external voice processing server for voice recognition and interpretation. Once the voice command has been interpreted, a response is sent back from the voice processing server. If the response contains an audio component, the response is played through speakers 144. The user may be notified via audio module 235. For example, audio module 235 can play a message, via speakers 144, of a next ingredient to be used in a recipe to the user. As another example, audio module 235 can play a message, via speakers 144, telling the user to stop adding an ingredient because the desired quantity has been reached.

Figure 3:
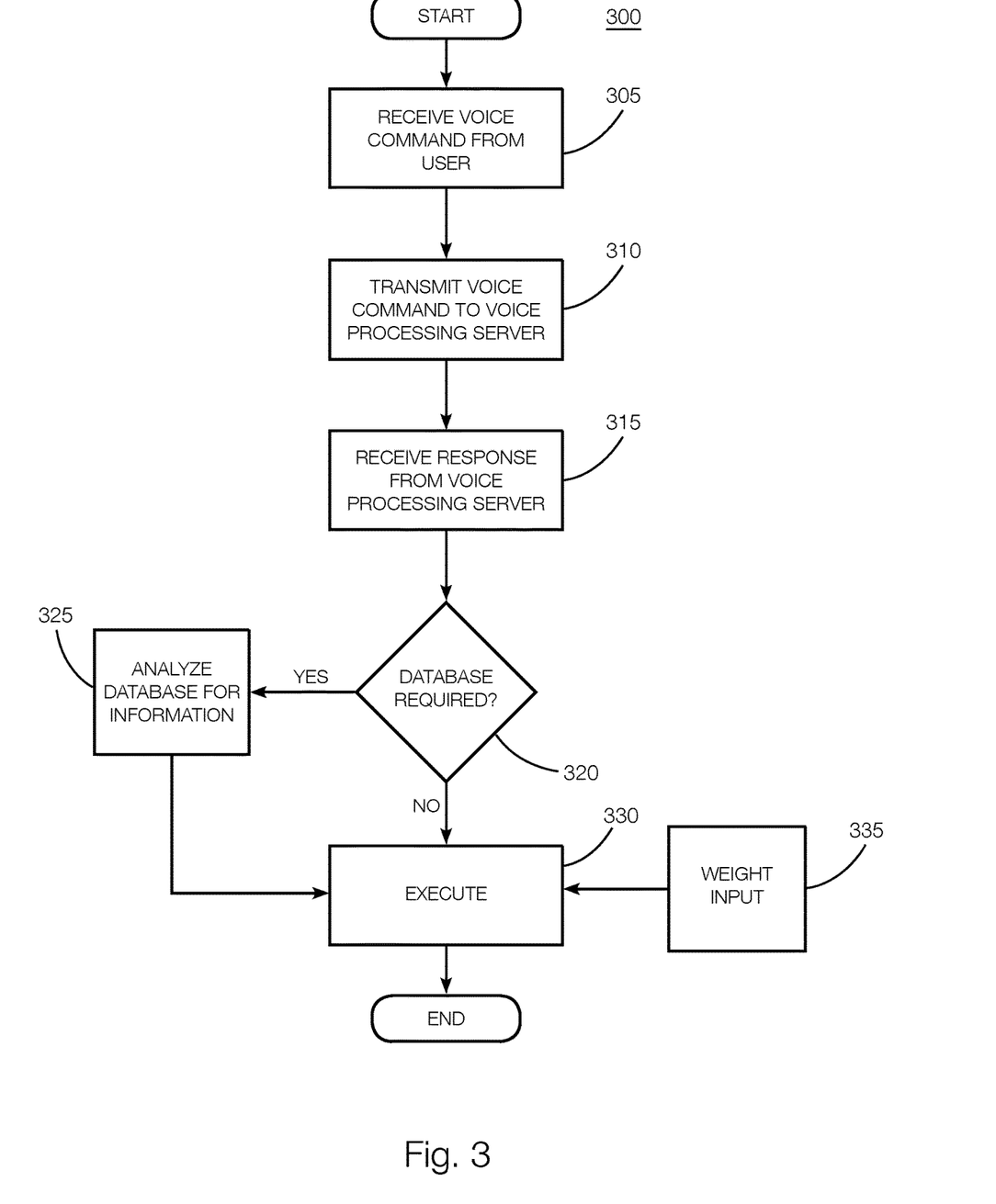
FIG. 3 is a flow diagram of a method for interacting with a weight-based kitchen assistant.

FIG. 3 is a flow diagram of an example method 300 showing how weight-based kitchen assistant 105 manages commands and weight inputs. Method 300 may be stored in memory (e.g., memory 215) and executed by a processor or controller (e.g., microcontroller 210). Method 300 begins by receiving a voice command associated with a food item from a user (block 305). Note that while FIG. 3 shows a voice command being received, other types of commands, such as signals generated by an app running on the user's device, can also be received.

The received voice command is transmitted, via a network, to an external voice processing server for natural language recognition and interpretation (block 310). Next, a response is received back from the voice processing server (block 315). The response includes an interpreted voice command. Based on the interpreted voice command, method 300 determines if access to a database is needed (block 320). For example, if the interpreted voice command indicates that the user is asking for the measurement of "two cups of blueberries," then method 300 will need to parse a database to find a density value unique to blueberries in order to convert volumetric measurements to weight measurements. On the other hand, if the interpreted voice command indicates that the user is asking for the measurement of "two-hundred grams of blueberries," then method 300 can skip the database and proceed to measure the weight of the blueberries directly.

If database access is needed, method 300 analyzes, via a network, an external database (e.g., database 705 in FIG. 7) for information (block 325). The database may store food data (e.g., density, nutritional value, substitutes, etc.) for a plurality of different food items or ingredients. The food data is a compilation of standardized properties and nutritional facts attributed to the different food items.

Once method 300 finds the appropriate information in the database, method 300 can begin executing the interpreted voice command (block 330). At this point, method 300 prompts the user for weight inputs (block 335). That is, to place or add the food item on weight-based kitchen assistant 105. Method 300 calculates the weight of the food item. As needed, the weight may be calculated based on the food data from the database. When a weight goal has been met, method 300 provide the user with a visual and/or audio feedback signal indicating that this step has been completed.

Figure 4A:
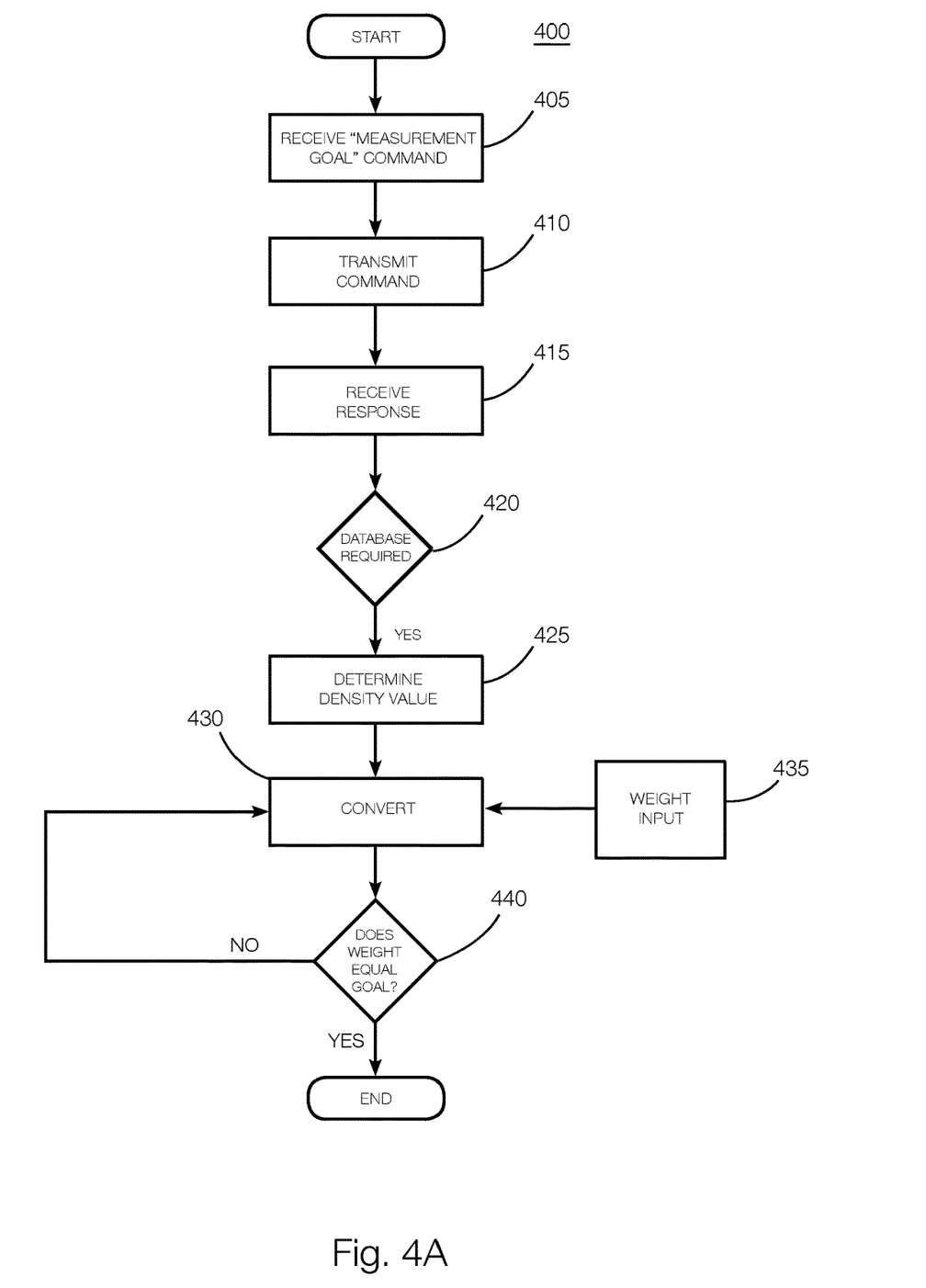
FIG. 4A is a flow diagram of a method for measuring a weight of a food item to a specific goal.
Figure 4B:
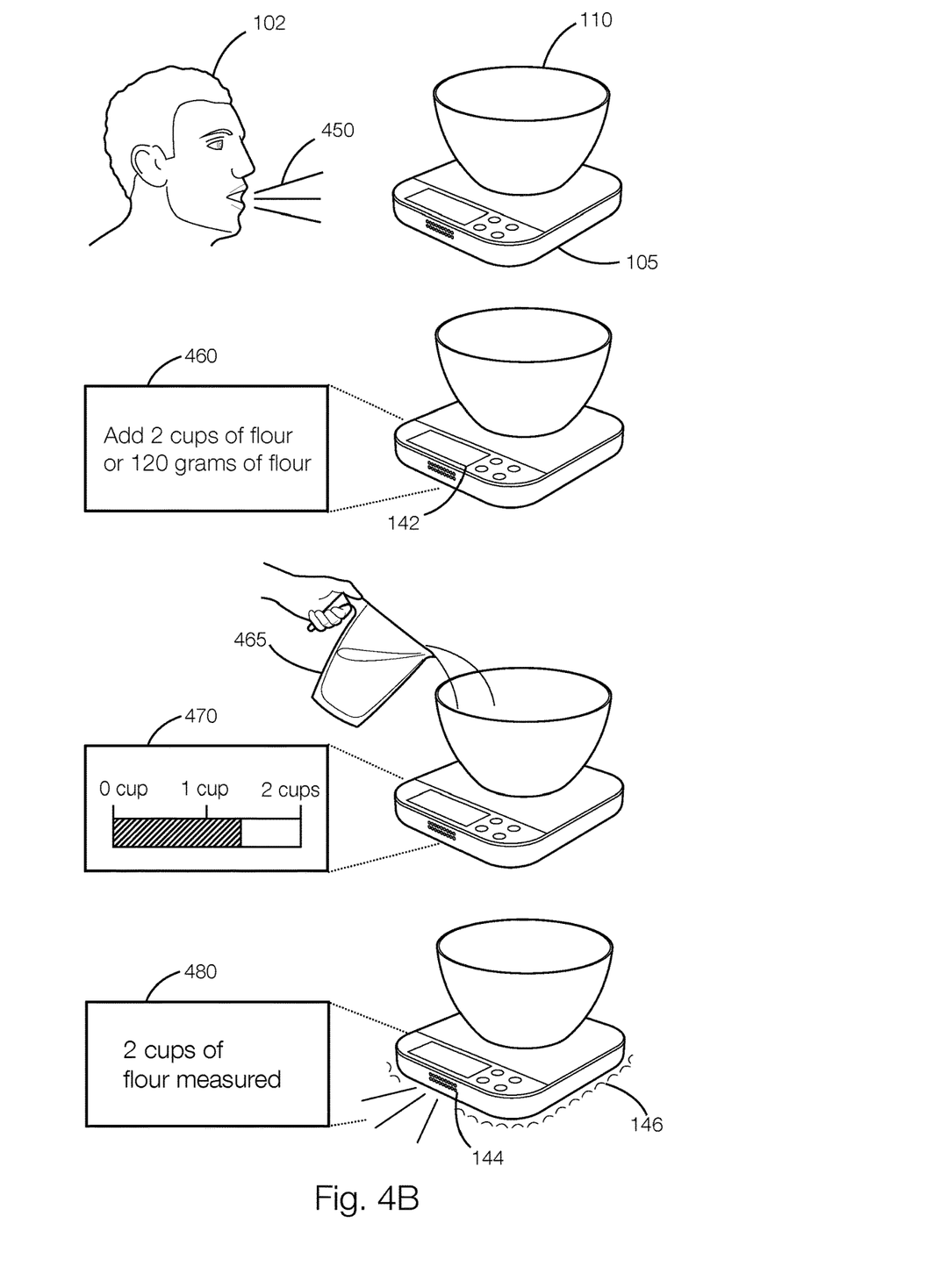
FIG. 4B is a graphical representation of a process for measuring a weight of a food item to a specific goal.

FIGS. 4A and 4B illustrate a process for measuring a weight of a food item to a specific goal. FIG. 4A is a flow diagram of an example method 400 for measuring the weight to the specific goal, while FIG. 4B is an accompanying graphical representation of the method. Method 400 may be stored in memory (e.g., memory 215) and executed by a processor or controller (e.g., microcontroller 210).

Method 400 begins by receiving a "measurement goal" command from a user indicating the specific goal (block 405). As shown in FIG. 4B, user 102 may provide a voice command 450 to specify a quantity of the food item to be measured. This quantity may be a volumetric quantity such as "measure two cups of flour." Method 400 then transmits received voice command 450, via a network (e.g., the Internet), to an external voice processing server for natural language recognition and interpretation (block 410). Next, a response is received back from the voice processing server (block 415). The response includes an interpreted voice command and is stored in memory (e.g., memory 215). Since the interpreted voice command indicates a volumetric quantity to be measured, method 400 proceeds to access and analyze, via a network, an external database (e.g., database 705B in FIG. 7) which stores food data for a plurality of different food items including flour (block 420).

By analyzing the database, method 400 determines a density value in the food data attributed to the food item—in this case flour (block 425). Generally, method 400 can determine and utilize the density of an object (food item or ingredient) as a conversion factor to move between volume and weight. Accordingly, applying the density value, method 400 converts a volumetric quantity into a weight quantity (block 430). For example, using the density value determined for flour, two cups of flour would equal to 120 grams of weight of flour.

At this point, method 400 receives weight inputs (block 435). As shown in FIG. 4B, weight-based kitchen assistant 105 may prompt user 102 to begin the process of adding and weighing the two cups of flour. For example, an output 460 may be displayed on display 142 of weight-based kitchen assistant 105. Note that bowl 110 is used as a means of containing the flour being added in FIG. 4B. However, in other scenarios with other food items, bowl 110 may not be needed.

In FIG. 4B, user 102 adds the food item or flour 465 to bowl 110 to be measured by weight-based kitchen assistant 105 (e.g., using weight sensing module 225). As a portion of the food item or flour 465 is added, method 400 determines if the weight of flour 465 is equal to the specific goal (block 440). As the measurement involves a volumetric quantity, method 400 determines the weight based on the portion of flour 465 received and the density value attributed to flour. An output 470 may be displayed on display 142 highlighting the progress being made toward the specific goal. Output 470 may be any suitable form of progressive comparison, such as a progress bar, a message showing how much is left to measure, a number reflecting the change in the amount that has been added, etc.

If the measured weight of flour 465 is equal to the specific goal, then method 400 determines that the specific goal has been achieved. If the measured weight is not equal to the specific goal, then method 400 returns to blocks 430 and 435 to continue receiving additional portions of flour 465 and comparing the measured weight of flour 465 to the specific goal originally requested. This process will continue until the specific goal has been reached, user 102 stops the process, or the process times-out.

As shown in FIG. 4B, when the specific goal is reached, any number of visual and/or audio feedback signals may be outputted by weight-based kitchen assistant 105. For example, an output 480 may be displayed on display 142. Additionally, or alternatively, output 480 may be played via speakers 144. Additionally, or alternatively, LED lights 146 may light up or flash to denote the completion of the specific goal.

Another utilization of weight-based kitchen assistant 105 is to determine nutritional values of meals without additional calculation. This has many practical uses, such as monitoring sodium intakes over several days or calorie counting.

Figure 5A:
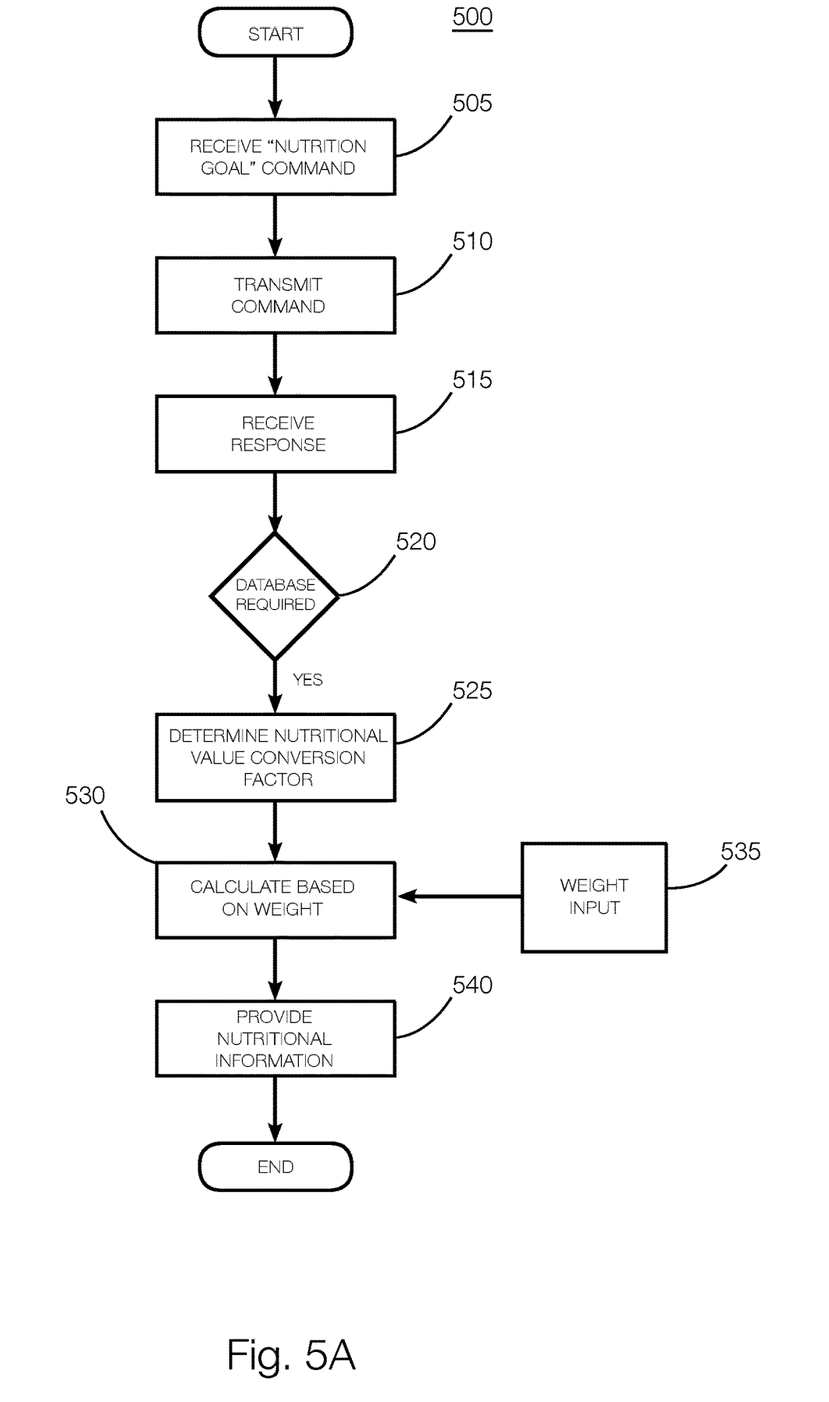
FIG. 5A is a flow diagram of a method for providing a user with nutritional information based on a weight of a food item.
Figure 5B:
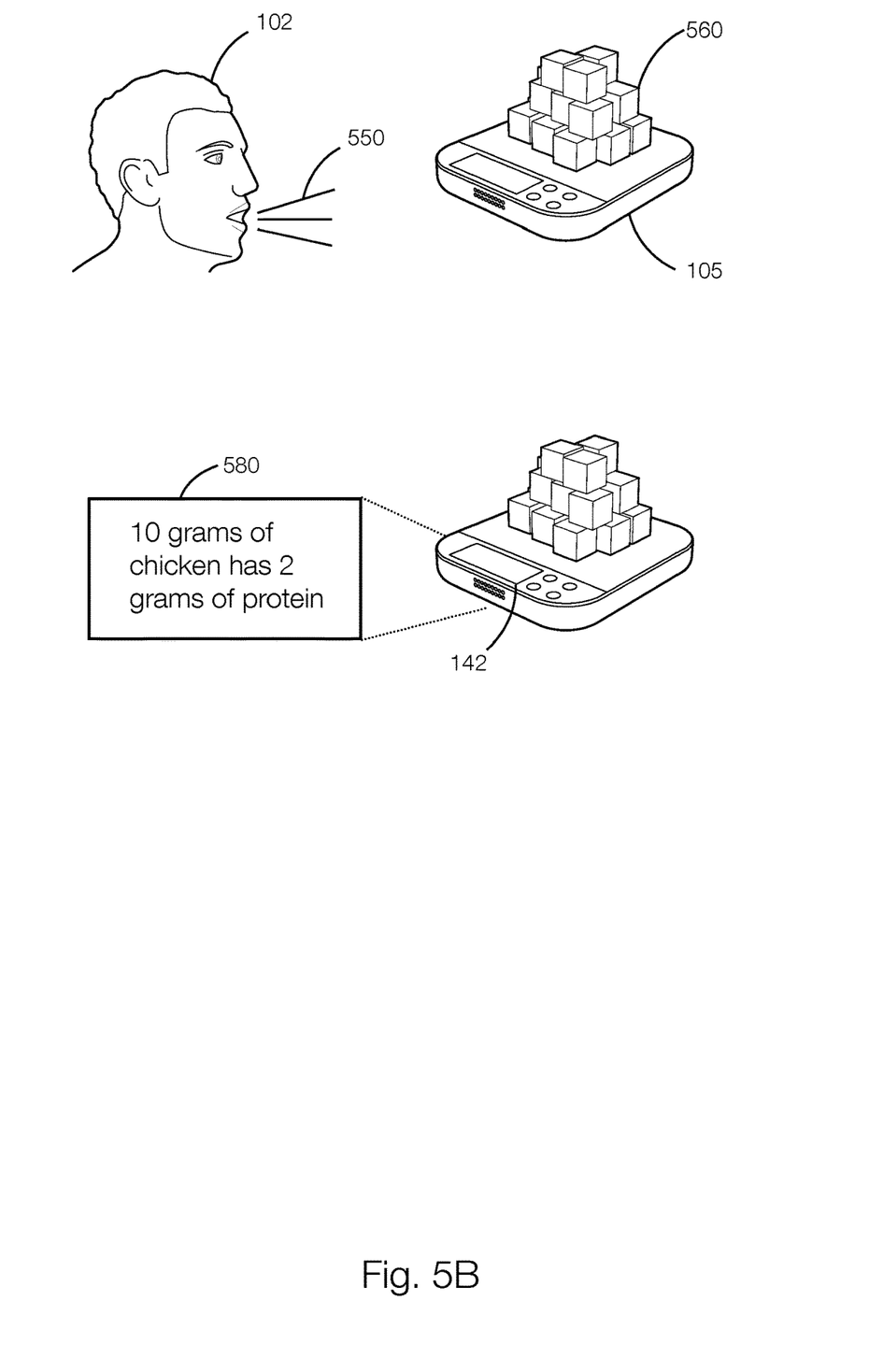
FIG. 5B is a graphical representation of a process for providing a user with nutritional information based on a weight of a food item.

FIGS. 5A and 5B illustrate a process for providing a user with nutritional information based on a weight of a food item. FIG. 5A is a flow diagram of an example method 500 for providing the nutritional information, while FIG. 5B is an accompanying graphical representation of the method. Method 500 may be stored in memory (e.g., memory 215) and executed by a processor or controller (e.g., microcontroller 210).

Method 500 begins by receiving a "nutritional goal" command from a user indicating a request for nutritional information (block 505). As shown in FIG. 5B, user 102 may provide a voice command 550 to determine a nutritional value of a food item, such as "how much protein is in this chicken." Method 500 then transmits received voice command 550, via a network (e.g., the Internet), to an external voice processing server for natural language recognition and interpretation (block 510). Next, a response is received back from the voice processing server (block 515). The response includes an interpreted voice command and is stored in memory (e.g., memory 215). Since the interpreted voice command indicates a query for nutritional information (i.e., "protein"), method 500 proceeds to access and analyze, via a network, an external database (e.g., database 705B in FIG. 7), which stores food data for a plurality of different food items including chicken (block 520).

Using the database, method 500 determines a nutritional value conversion factor attributed to the food item—in this case chicken (block 525). For example, 100 grams of chicken may contain 20 grams of protein. Applying this nutritional value conversion factor to a measured weight, method 500 can calculate how much protein is in a particular amount of food item (block 530).

At this point, method 500 receives weight inputs (block 535). As shown in FIG. 5B, pieces of food item 560 (e.g., chicken) are placed by user 102 on top of weight-based kitchen assistant 105 to be measured by weight sensing module 225, for example. Note that unless user 102 is progressing through the steps of a recipe, user 102 must indicate the specific food item or ingredient that is being placed on weight-based kitchen assistant 105. Based on the weight of food item 560 and the determined nutritional value conversion factor, method 500 determines and provides the nutritional value for the food item 560 (block 540). An output 580 may be displayed on display 142 to indicate such nutritional information.

Figure 6A:
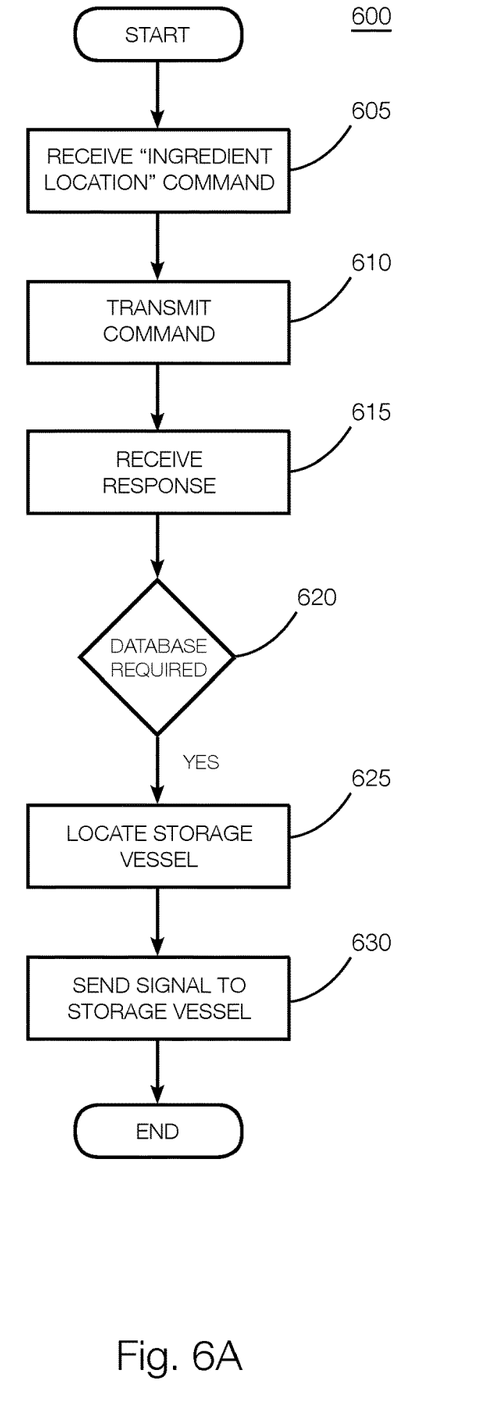
FIG. 6A is a flow diagram of a method for locating food items stored within connected storage vessels.
Figure 6B:
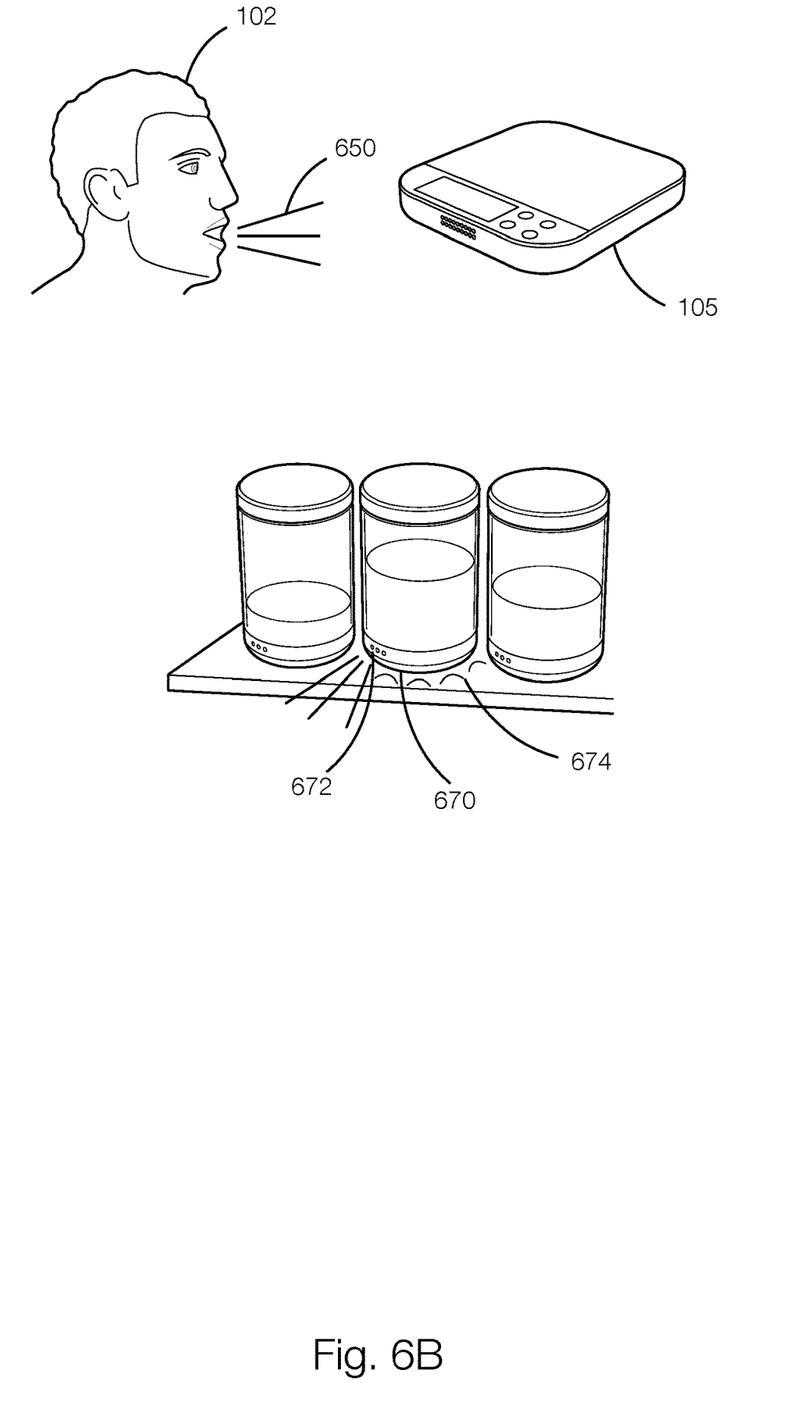
FIG. 6B is a graphical representation of a process for locating food items stored within connected storage vessels.

A user may wish to manage and locate inventories of food items (e.g., flour, grain, sugar, etc.) stored inside peripheral storage vessels that are communicatively connected to weight-based kitchen assistant 105. As such, FIGS. 6A and 6B illustrate a process for locating food items stored within connected storage vessels. FIG. 6A is a flow diagram of an example method 600 for locating the food items, while FIG. 6B is an accompanying graphical representation of the method. Method 600 may be stored in memory (e.g., memory 215) and executed by a processor or controller (e.g., microcontroller 210).

Method 600 begins by receiving a "ingredient location" command from a user indicating a query for determining where food items are located in storage vessels within a kitchen (block 605). As shown in FIG. 6B, user 102 may provide a voice command 650, such as "show me where the flour is located." While FIG. 6B shows voice command 650 being received, the "ingredient location" command may be generated by other means, such as an app running on user 102's device or even by weight-based kitchen assistant 105 itself.

Method 600 then transmits received voice command 650, via a network (e.g., the Internet), to an external voice processing server for natural language recognition and interpretation (block 610). Next, a response is received back from the voice processing server (block 615). The response includes an interpreted voice command and is stored in memory (e.g., memory 215). Since the interpreted voice command indicates a query for locating food items nearby or within the kitchen, method 600 proceeds to access and analyze, via a network, an external database (e.g., database 705C in FIG. 7), which stores information regarding the inventory of food items that user 102 maintains (block 620). When a food item or ingredient is stored in a connected storage vessel, the food item and its quantity are documented in the database.

Method 600 proceeds to search and identify a correct storage vessel that contains the food item (block 625). When the correct storage vessel is located, method 600 pushes or transmits a signal to the storage vessel to enable the storage vessel to be easily identified by the user (block 630). As shown in FIG. 6B, once a storage vessel 670 is identified, storage vessel 670 will provide user 102 with a signal that make storage vessel 670 stand out from other storage vessels. For example, storage vessel 670 may emit sound (e.g., beeps) via speakers 672, or emit flashes of light via LEDs 674.

Figure 7:
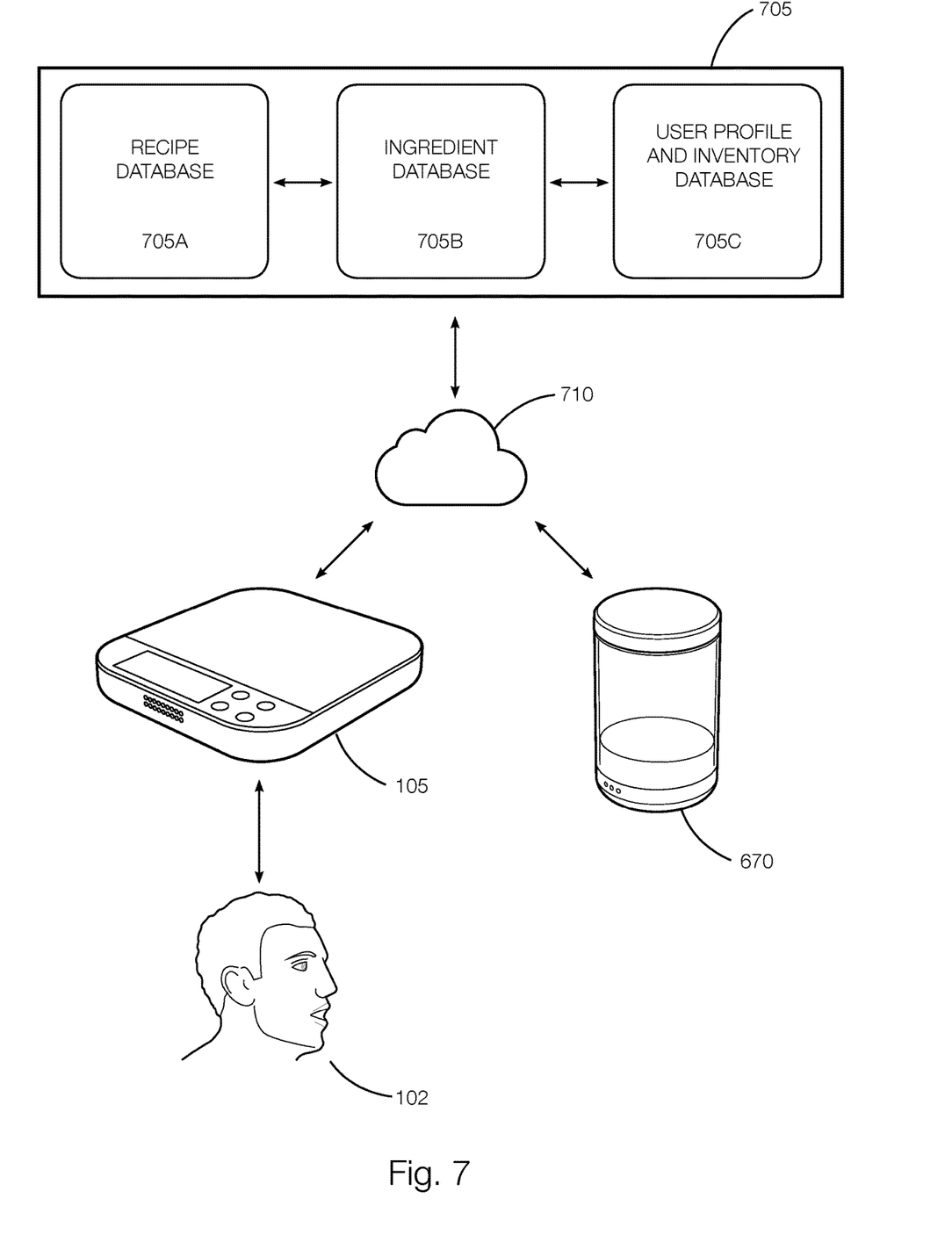
FIG. 7 is a block diagram of a weight-based kitchen assistant interacting with other connected devices.

FIG. 7 is a block diagram of weight-based kitchen assistant 105 interacting with other connected devices such as database 705 and storage vessel 670. Database 705 may include a plurality of databases such as a recipe database 705A, an ingredient database 705B, and a user profile/inventory database 705C. User 102 interacts with weight-based kitchen assistant 105, which in turn communicates with database 705 and storage vessel 670 via a communication network 710 (e.g., the Internet). This form of Internet-based communication allows for signals to be sent wirelessly from the one device to another without the need for proximity or peer-to-peer device communication.

Database 705 may be part of a centralized web server. Recipe database 705A stores various recipes created by users or entities. Ingredient database 705B stores food data for various ingredients or food items, such as density information, nutritional information, ingredient substitutions, and other suitable information related to the properties of the food item. Due to the inherent differences in like ingredients or food items provided by different suppliers, a margin of error can be expected and is included in database 705B. This margin of error can be applied to future food items or ingredients to keep consistent ratios between recipes. User profile/inventory database 705C stores information related to a user (e.g., user 102) such as allergies and food preferences, as well as information regarding the inventory of food items that the user maintains in storage vessels (e.g., storage vessel 670) within the kitchen.

In an example scenario of weight-based kitchen assistant 105 interacting with other connected devices, user 102 may request to know the amount of sugar stored in the kitchen. As such, user 102 makes an audio request to weight-based kitchen assistant 105. After the audio request has been processed, weight-based kitchen assistant 105 accesses, via network 710, user profile/inventory database 705C to determine where sugar is being stored. From database 705C, weight-based kitchen assistant 105 determines that sugar is stored in storage vessel 670. The amount of sugar kept in storage vessel 670 is also retrieved from database 705C. In some embodiments, storage vessel 670 may include a weight sensing module (e.g., similar to weight sensing module 225) that can be used to determine the actual weight or amount of sugar in storage vessel 670. This information may then be conveyed back to weight-based kitchen assistant 105. In any event, the value for the amount of sugar in storage vessel 670 is received by weight-based kitchen assistant 105 and relayed to user 102. By using weight-based kitchen assistant 105 in conjunction with database 705 that includes various food data, user profiles, and kitchen inventory information, user 102 can have a unique experience in cooking and preparing meals in the kitchen.

Moreover, user 102 can issue voice commands that specify a desire to follow a recipe. In this case, weight-based kitchen assistant 105 can access database 705 to determine the various steps of the recipe and then provide instruction to user 102 to follow the various steps by, for example, measuring a quantity of food item or ingredient included in a step of the recipe.

Figure 8:
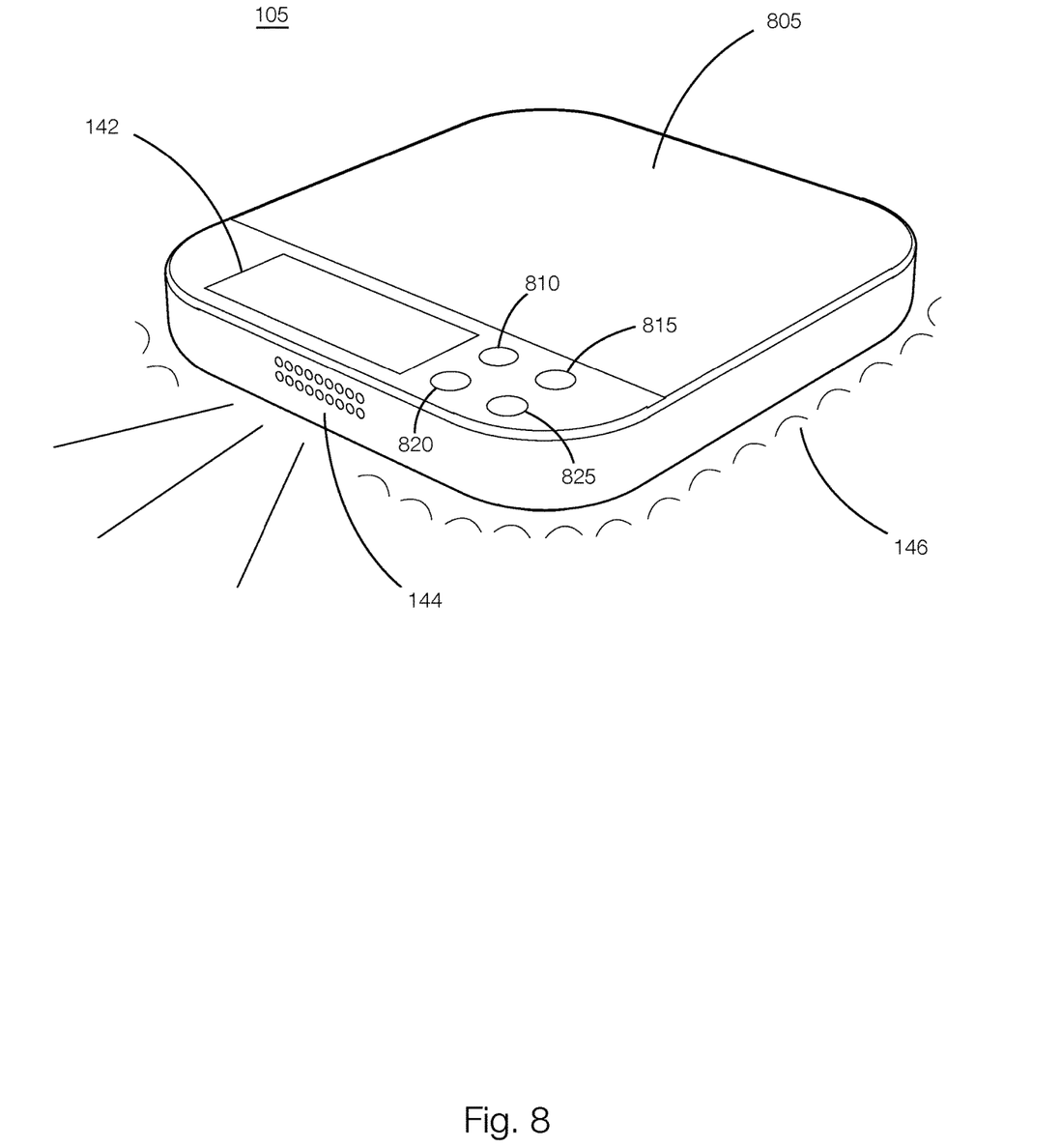
FIG. 8 is a front perspective view of a weight-based kitchen assistant.

FIG. 8 is a front perspective view of weight-based kitchen assistant 105. Food items or ingredient that a user wishes to weigh or add to in a recipe are placed on a surface 805. Surface 805 may be part of or include weight sensing module 225. Surface 805 can accommodate food items of various sizes as well as kitchen containers (e.g., bowl 110).

Push or touch buttons 810-825 provide the user with another means of interacting with weight-based kitchen assistant 105 beyond the use of voice commands. These include, but are not limited to, a volume-up button 810, a volume-down button 815, a mute button 820, and an action button 825. Volume buttons 810, 815 adjust the volume of weight-based kitchen assistant 105 to a desired level. However, the volume of weight-based kitchen assistant 105 can also be toggled via voice commands. Mute button 820 toggles a microphone (in audio feedback module 235) on and off. Action button 825 can be used to perform a variety of functions such as confirmation, moving between steps in a recipe, pairing peripheral devices, enabling wireless communication, waking up the device, turning off a timer or alarm, calibration procedures such as zeroing or tearing, etc.

Display 142 provides the user with visual information. For example, display 142 may show the steps of a recipe, a current weight on surface 805, and/or a current unit of measurement. Additionally, display 142 may show weather and/or entertainment information (e.g., a song that is being played). Display 142 is controlled by visual feedback module 230.

Speakers 144 provide the user with audio information. For example, while cooking a recipe, the user may be notified by speakers 144 that "the next step in the recipe is to add two cups of sugar." This audio feedback may be paired with visual graphics on display 142 prompting the user to begin adding sugar. Additionally, speakers 144 may provide the user with feedback to a request. For example, if the user asks, "how many grams of protein do these almonds have," weight-based kitchen assistant 105 may parse a database to find the protein content for almonds per unit and then calculate the protein value with the current weight input on surface 805. Afterward, speakers 144 may reply to the user with, "these almonds have 15 grams of protein." Speakers 144 are controlled by audio feedback module 235.

LED lights 146 along the bottom surface of weight-based kitchen assistant 105 act as an additional means of visual feedback. LED lights 146 may indicate various device statuses (e.g., charging status, low-battery status, fully-charged status, sleep status, etc.) and/or functionalities (e.g., progress within a recipe, current weight input relative to a set goal in a recipe step, etc.). These indications are achieved by LEDs 146 changing color, brightness, motion, etc. LEDs 146 are controlled by visual feedback module 230.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. An electronic scale comprising:
a weight sensing module; and
a controller coupled to the weight sensing module, the controller configured to:
receive a voice command associated with a food item from a user;
transmit, via a network, the received voice command to a voice processing server for natural language interpretation;
receive, via the network, a response from the voice processing server indicating an interpreted voice command;
based on the interpreted voice command, analyze, via the network, a database to determine food data attributed to the food item;
receive a portion of the food item on the weight sensing module; and
measure a quantity of the food item based on the portion of the food item received on the weight sensing module and the determined food data attributed to the food item.

2. The electronic scale of claim 1, wherein the controller is further configured to indicate that the quantity of the food item has been measured by at least one of a visual feedback signal and an audio feedback signal.

3. The electronic scale of claim 1, wherein the received voice command includes the quantity of the food item to be measured, and the controller is further configured to:
receive additional portions of the food item on the weight sensing module if the quantity of the food item has not been measured based on the portion of the food item received.

4. The electronic scale of claim 1, wherein the received voice command includes a measurement of a volumetric quantity of the food item, and the controller is further configured to:
determine a density value in the food data attributed to the food item to convert the volumetric quantity into a weight quantity; and
determine that the volumetric quantity of the food item has been measured based on the portion of the food item received on the weight sensing module and the density value.

5. The electronic scale of claim 1, wherein the received voice command includes a measurement of a nutritional value of the food item, and the controller is further configured to:
  determine a nutritional value conversion factor in the food data attributed to the food item; and
  determine the nutritional value of the food item based on the portion of the food item received on the weight sensing module and the nutritional value conversion factor.

6. The electronic scale of claim 1, wherein the received voice command includes a determination of where the food item is located within a kitchen, and the controller is further configured to:
  analyze the database to determine a storage vessel that contains the food item within the kitchen; and
  upon determining the storage vessel, transmit a signal to the storage vessel to enable the storage vessel to be identified by the user.

7. The electronic scale of claim 1, wherein the received voice command is based on a signal transmitted from the user's device.

8. A method in an electronic scale comprising:
  receiving, by the electronic scale, a voice command associated with a food item from a user;
  transmitting, by the electronic scale via a network, the received voice command to a voice processing server for natural language interpretation;
  receiving, by the electronic scale via the network, a response from the voice processing server indicating an interpreted voice command;
  based on the interpreted voice command, analyzing, by the electronic scale via the network, a database to determine food data attributed to the food item;
  receiving, on the electronic scale, a portion of the food item; and
  measuring, by the electronic scale, a quantity of the food item based on the portion of the food item received on the electronic scale and the determined food data attributed to the food item.

9. The method of claim 8, further comprising indicating that the quantity of the food item has been measured by at least one of a visual feedback signal and an audio feedback signal.

10. The method of claim 8, wherein the received voice command includes the quantity of the food item to be measured, and the method further comprises:
  receiving additional portions of the food item on the electronic scale if the quantity of the food item has not been measured based on the portion of the food item received.

11. The method of claim 8, wherein the received voice command includes a measurement of a volumetric quantity of the food item, and the method further comprises:
  determining a density value in the food data attributed to the food item to convert the volumetric quantity into a weight quantity; and
  determining that the volumetric quantity of the food item has been measured based on the portion of the food item received on the weight sensing module and the density value.

12. The method of claim 8, wherein the received voice command includes a measurement of a nutritional value of the food item, and the method further comprises:
  determining a nutritional value conversion factor in the food data attributed to the food item; and
  determining the nutritional value of the food item based on the portion of the food item received on the electronic scale and the nutritional value conversion factor.

13. The method of claim 8, wherein the received voice command includes a determination of where the food item is located within a kitchen, and the method further comprises:
  analyzing the database to determine a storage vessel that contains the food item within the kitchen; and
  upon determining the storage vessel, transmitting a signal to the storage vessel to enable the storage vessel to be identified by the user.

14. The method of claim 8, wherein the received voice command includes an indication to follow a recipe that includes the food item, and the method further comprises:
  analyzing the database to determine one or more steps of the recipe; and
  providing instructions to the user to follow the one or more steps of the recipe by measuring the quantity of the food item.

15. A system comprising:
  an electronic scale; and
  a database;
  the electronic scale comprising a controller configured to:
    receive a voice command associated with a food item from a user;
    transmit, via a network, the received voice command to a voice processing server for natural language interpretation;
    receive, via the network, a response from the voice processing server indicating an interpreted voice command;
    based on the interpreted voice command, analyze, via the network, the database to determine food data attributed to the food item;
    receive a portion of the food item on the electronic scale; and
    measure a quantity of the food item based on the portion of the food item received on the electronic scale and the determined food data attributed to the food item.

16. The system of claim 15, wherein the received voice command includes the quantity of the food item to be measured, and the controller is further configured to:
  receive additional portions of the food item on electronic scale if the quantity of the food item has not been measured based on the portion of the food item received.

17. The system of claim 15, wherein the received voice command includes a measurement of a volumetric quantity of the food item, and the controller is further configured to:
  determine a density value in the food data attributed to the food item to convert the volumetric quantity into a weight quantity; and
  determine that the volumetric quantity of the food item has been measured based on the portion of the food item received on the weight sensing module and the density value.

18. The system of claim 15, wherein the received voice command includes a measurement of a nutritional value of the food item, and the controller is further configured to:
  determine a nutritional value conversion factor in the food data attributed to the food item; and
  determine the nutritional value of the food item based on the portion of the food item received on the weight sensing module and the nutritional value conversion factor.

19. The system of claim 15, wherein the received voice command includes a determination of where the food item is located within a kitchen, and the controller is further configured to:
 analyze the database to determine a storage vessel that contains the food item within the kitchen; and
 upon determining the storage vessel, transmit a signal to the storage vessel to enable the storage vessel to be identified by the user.

20. The system of claim 15, wherein the received voice command includes an indication to follow a recipe that includes the food item, and the controller is further configured to:
 analyze the database to determine one or more steps of the recipe; and
 provide instructions to the user to follow the one or more steps of the recipe by measuring the quantity of the food item.

\* \* \* \* \*